United States Patent
Wang et al.

(10) Patent No.: US 10,824,279 B2
(45) Date of Patent: Nov. 3, 2020

(54) REMOTE FEEDBACK TAPPING FOR A TOUCH SENSOR PANEL DRIVING CIRCUIT

(71) Applicant: Apple Inc., Cupertino, CA (US)

(72) Inventors: Chaohao Wang, Sunnyvale, CA (US);
Yingxuan Li, Saratoga, CA (US);
Hung Sheng Lin, Cupertino, CA (US);
Paolo Sacchetto, Cupertino, CA (US);
Szu-Hsien Lee, Cupertino, CA (US);
Weijun Yao, San Jose, CA (US);
Howard Tang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/869,409

(22) Filed: Sep. 29, 2015

(65) Prior Publication Data

US 2016/0231838 A1 Aug. 11, 2016

Related U.S. Application Data

(60) Provisional application No. 62/113,329, filed on Feb. 6, 2015.

(51) Int. Cl.
*G06F 3/044* (2006.01)
*G06F 1/16* (2006.01)
(Continued)

(52) U.S. Cl.
CPC ............ *G06F 3/044* (2013.01); *G06F 1/1643* (2013.01); *G06F 3/0412* (2013.01); *G06F 3/0416* (2013.01)

(58) Field of Classification Search
CPC .................. H03K 17/955; G06F 3/044; G09G 2300/0426; G09F 3/044
See application file for complete search history.

(56) References Cited

U.S. PATENT DOCUMENTS 4,908,566 A 3/1990 Tesch
5,459,483 A * 10/1995 Edwards .............. G09G 3/3688
345/98
(Continued)

FOREIGN PATENT DOCUMENTS

JP 2000-163031 A 6/2000
JP 2002-342033 A 11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Lin Li
(74) *Attorney, Agent, or Firm* — Kubota & Basol LLP

(57) ABSTRACT

A system is disclosed. The system can comprise drive circuitry included in a first component of the system, the drive circuitry configured to drive a first touch electrode on a touch sensor panel. The system can also comprise a driving line configured to couple an output of the drive circuitry to the first touch electrode. The system can also comprise a feedback line configured to couple the output of the drive circuitry to an input of the drive circuitry, wherein a first end of the feedback line is coupled to the input of the drive circuitry at the first component, and a second end of the feedback line is configured to be coupled to the output of the drive circuitry at a second component, different from the first component, of the system.

21 Claims, 11 Drawing Sheets

(51) Int. Cl.
*G06F 3/041* (2006.01)
*G09G 3/36* (2006.01)
*G09G 3/32* (2016.01)
*G06F 3/047* (2006.01)

(56) References Cited

U.S. PATENT DOCUMENTS

| | | | |
|---|---|---|---|
| 5,469,509 A | 11/1995 | Navone et al. | |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,806,855 B2 * | 10/2004 | Miura | G09G 3/3685 345/102 |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 9,223,425 B1 * | 12/2015 | Kim | G06F 3/0412 |
| 9,916,788 B2 * | 3/2018 | Tokunaga | G09G 3/3233 |
| 2001/0043168 A1 * | 11/2001 | Koyama | G09G 3/3225 345/52 |
| 2006/0197753 A1 | 9/2006 | Hotelling | |
| 2010/0033450 A1 * | 2/2010 | Koyama | G06F 3/0412 345/175 |
| 2010/0045310 A1 * | 2/2010 | Betancourt | G06F 3/044 324/686 |
| 2010/0214259 A1 * | 8/2010 | Philipp | G06F 3/0416 345/174 |
| 2011/0279438 A1 * | 11/2011 | Ito | H03K 19/018521 345/212 |
| 2011/0298746 A1 * | 12/2011 | Hotelling | G06F 3/0418 345/174 |
| 2012/0153293 A1 * | 6/2012 | Koyama | G09G 3/3258 257/72 |
| 2013/0069904 A1 * | 3/2013 | Krah | G06F 3/0418 345/174 |
| 2013/0076646 A1 * | 3/2013 | Krah | G06F 3/047 345/173 |
| 2013/0241873 A1 * | 9/2013 | Kim | H05K 1/0228 345/174 |
| 2013/0335342 A1 | 12/2013 | Kim et al. | |
| 2014/0111466 A1 * | 4/2014 | Kim | G06F 3/0412 345/174 |
| 2015/0234496 A1 * | 8/2015 | Mizuhashi | G06F 3/044 345/174 |
| 2016/0181345 A1 * | 6/2016 | Lee | H01L 27/3276 257/40 |
| 2016/0282976 A1 * | 9/2016 | Yang | G06F 3/044 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

REMOTE FEEDBACK TAPPING FOR A TOUCH SENSOR PANEL DRIVING CIRCUIT

CROSS-REFERENCE TO RELATED APPLICATIONS

This application claims benefit of U.S. Provisional Patent Application No. 62/113,329, filed Feb. 6, 2015, which is hereby incorporated by reference in its entirety.

FIELD OF THE DISCLOSURE

This relates generally to touch sensor panels, and more particularly, to a driving circuit for a touch sensor panel that utilizes remote feedback tapping.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent or non-transparent conductive plates made of materials such as Indium Tin Oxide (ITO). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stackup (i.e., the stacked material layers forming the display pixels). In some examples, common electrodes on the touch screen can serve as touch sensing circuitry during a touch sensing phase, and can serve as display circuitry during a display phase. During the display phase, the common electrodes may be driven to a reference voltage while display pixels are updated or scanned. In some examples, the common electrodes can be driven by one or more driving circuits. In certain circumstances, the voltage(s) on the common electrodes can be disturbed from the reference voltage (e.g., as a result of voltage changes on other touch screen components that may be in proximity to, or otherwise capacitively coupled to, the common electrodes). The time that it can take for the driving circuit to reestablish the voltage on the common electrodes to the reference voltage, which can be referred to as the settling time of the driving circuit, can be affected by the resistance and the capacitance presented at the output of the driving circuit. In some examples, the resistance presented at the output of the driving circuit can include resistances from various components that may exist between the driving circuit and the common electrodes; for example, conductive trace resistances, contact resistances, switching circuit resistances, etc. It can be beneficial to reduce the resistance presented at the output of the driving circuit to reduce the effect of such resistance on the settling time of the driving circuit. In some examples, the resistance presented at the output of the driving circuit can be reduced by including at least portions of the above-described component-resistances within a feedback loop of the driving circuit (i.e., utilizing "remote feedback tapping").

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some capacitive touch sensor panels can be formed by a matrix of substantially transparent conductive plates made of materials such as Indium Tin Oxide (ITO), and some touch screens can be formed by at least partially integrating touch sensing circuitry into a display pixel stackup (i.e., the stacked material layers forming the display pixels). In some examples, common electrodes on the touch screen can serve as touch sensing circuitry during a touch sensing phase, and can serve as display circuitry during a display phase. During the display phase, the common electrodes may be driven to a reference voltage while display pixels are updated or scanned. In some examples, the common electrodes can be driven by one or more driving circuits. In certain circumstances, the voltage(s) on the common electrodes can be disturbed from the reference voltage (e.g., as a result of voltage changes on other touch screen components that may be in proximity to, or otherwise capacitively coupled to, the common electrodes). The time that it can take for the driving circuit to reestablish the voltage on the common electrodes to the reference voltage, which can be referred to as the settling time of the driving circuit, can be affected by the resistance and the capacitance presented at the output of the driving circuit. In some examples, the resistance presented at the output of the driving circuit can include resistances from various components that may exist between the driving circuit and the common electrodes; for example, conductive trace resistances, contact resistances, switching circuit resistances, etc. It can be beneficial to reduce the resistance presented at the output of the driving circuit to reduce the effect of such resistance on the settling time of the driving circuit. In some examples, the resistance presented at the output of the driving circuit can be reduced by including at least portions of the above-described component-resistances within a feedback loop of the driving circuit (i.e., utilizing "remote feedback tapping").

Figure 1C:
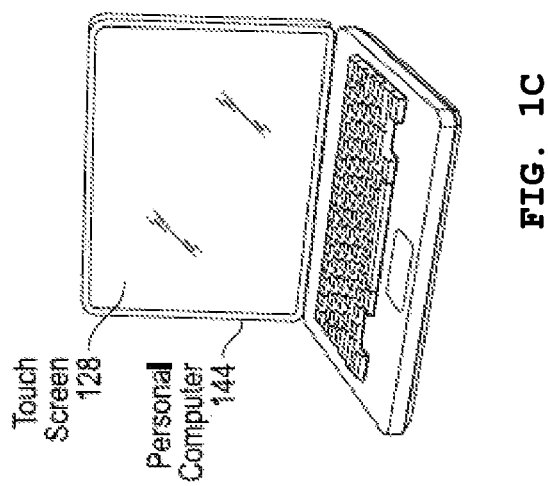
FIGS. 1A-1C illustrate an example mobile telephone, an example media player, and an example portable computing device that each include an exemplary touch screen according to examples of the disclosure.
Figure 1B:
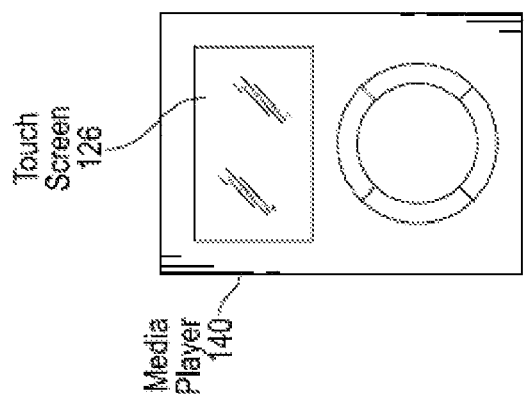
Figure 1A:
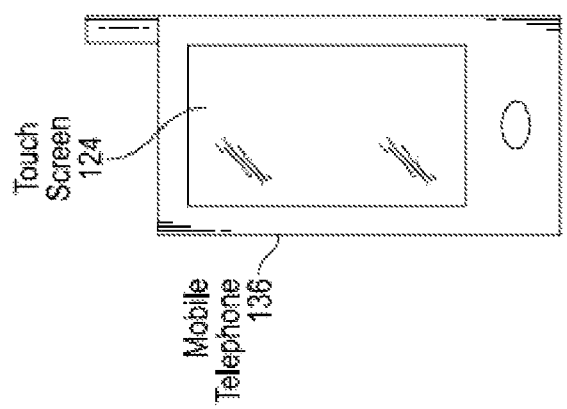

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example portable computing device 144 that includes a touch screen 128. Touch screens 124, 126, and 128 can be based on self-capacitance. A self-capacitance based touch system can include a matrix of small, individual plates of conductive material that can be referred to as touch node electrodes (as described below with reference to touch screen 220 in FIG. 2). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126 and 128 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

Figure 2:
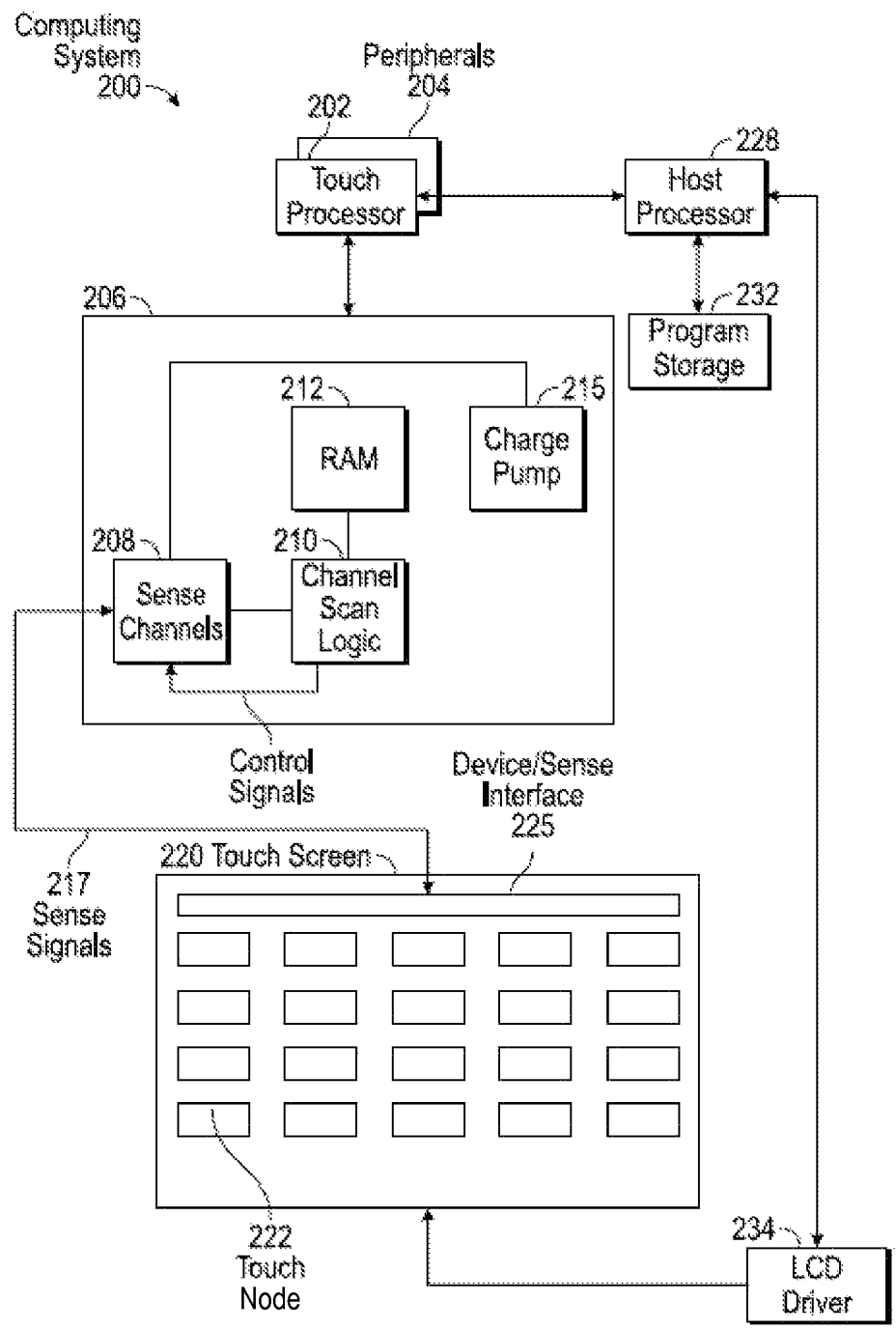
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 220 according to examples of the disclosure. It is understood that computing system 200 can instead include a mutual capacitance touch screen, as described above, though the examples of the disclosure will be described assuming a self-capacitance touch screen is provided. Computing system 200 can be included in, for example, mobile telephone 136, digital media player 140, portable computing device 144, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch node electrodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (e.g., gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3:
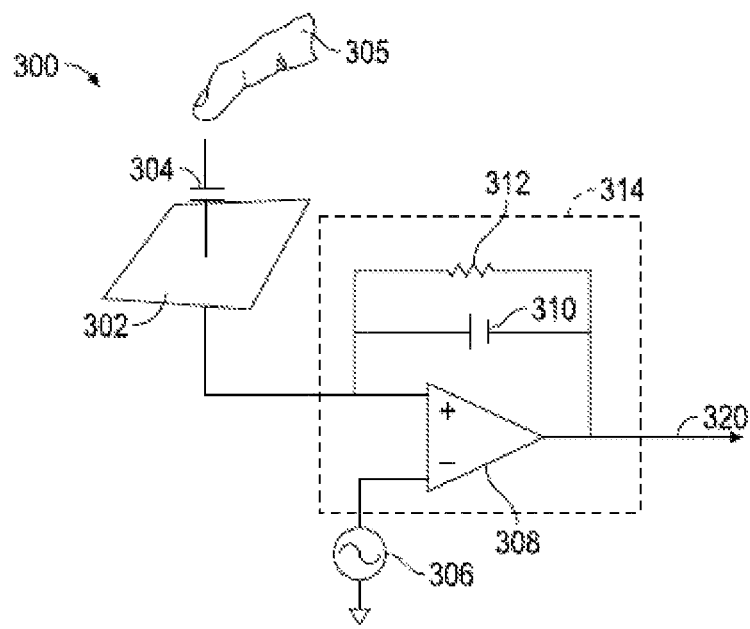
FIG. 3 illustrates an exemplary touch sensor circuit corresponding to a self-capacitance touch node electrode and sensing circuit according to examples of the disclosure.

FIG. 3 illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 4:
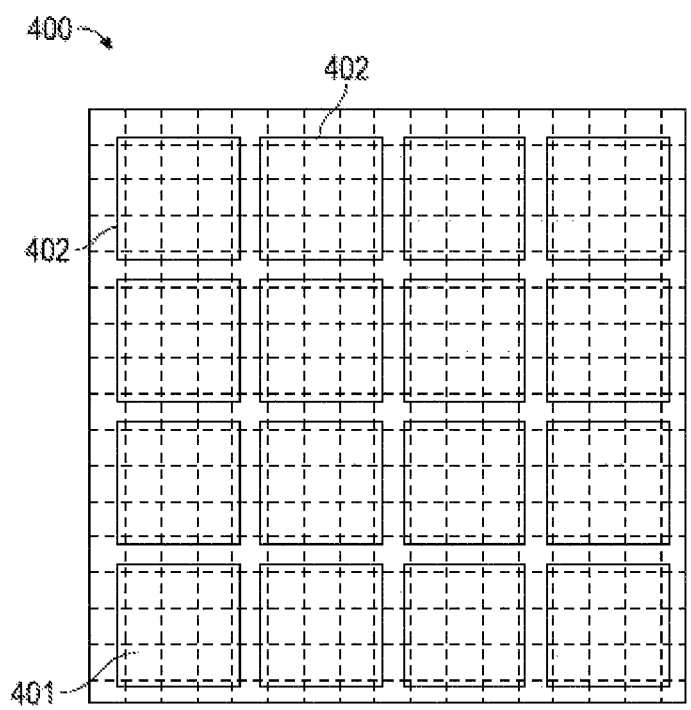
FIG. 4 illustrates an example configuration in which common electrodes can form portions of the touch sensing circuitry of a touch sensing system according to examples of the disclosure.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 4 illustrates an example configuration in which common electrodes 402 can form portions of the touch sensing circuitry of a touch sensing system—in some examples of this disclosure, the common electrodes can form touch node electrodes used to detect a touch image on touch screen 400, as described above. Each common electrode 402 can include a plurality of display pixels 401 (illustrated as the small squares having dashed-line borders), and each display pixel 401 can include a portion of a common electrode 402, which can be a circuit element of the display system circuitry in the display pixel stackup (i.e., the stacked material layers forming the display pixels) of the display pixels of some types of LCDs or other displays—in other words, the common electrodes can operate as part of the display system to display a display image on touch screen 400.

In the example shown in FIG. 4, each common electrode 402 can serve as a multi-function circuit element that can operate as display circuitry of the display system of touch screen 400 and can also operate as touch sensing circuitry of the touch sensing system. Specifically, each common electrode 402 can operate as a common electrode of the display circuitry of the touch screen 400 (e.g., during a display phase), as described above, and can also operate as a touch node electrode of the touch sensing circuitry of the touch screen (e.g., during a touch sensing phase). Other circuit elements of touch screen 400 can also form part of the touch sensing circuitry. More specifically, in some examples, during the touch sensing phase, a gate line can be connected to a power supply, such as a charge pump, that can apply a voltage to maintain TFTs in display pixels included in a common electrode 402 in an "off" state. Stimulation signals can be applied to the common electrode 402. Changes in the total self-capacitance of the common electrode 402 can be sensed through one or more operational amplifiers, as previously discussed. The changes in the total self-capacitance of the common electrode 402 can depend on the proximity of an object, such as finger 305, to the common electrode. In this way, the measured changes in total self-capacitance of the common electrode 402 can provide an indication of touch on or near the touch screen. A mutual capacitance touch screen can similarly be implemented in which common electrodes can form portions of the touch sensing circuitry of the mutual capacitance touch screen. For example the common electrodes can form drive or sense lines used to detect a touch image on the touch screen, as described above.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlapping, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 402 (i.e., touch node electrodes) and display pixels 401 of FIG. 4 are shown as rectangular or square regions on touch screen 400. However, it is understood that the common electrodes 402 and display pixels 401 are not limited to the shapes, orientations, and positions shown, but can include any suitable configurations according to examples of the disclosure. Further, the examples of the disclosure will be provided in the context of a touch screen, but it is understood that the examples of the disclosure can similarly be implemented in the context of a touch sensor panel.

Figure 5A:
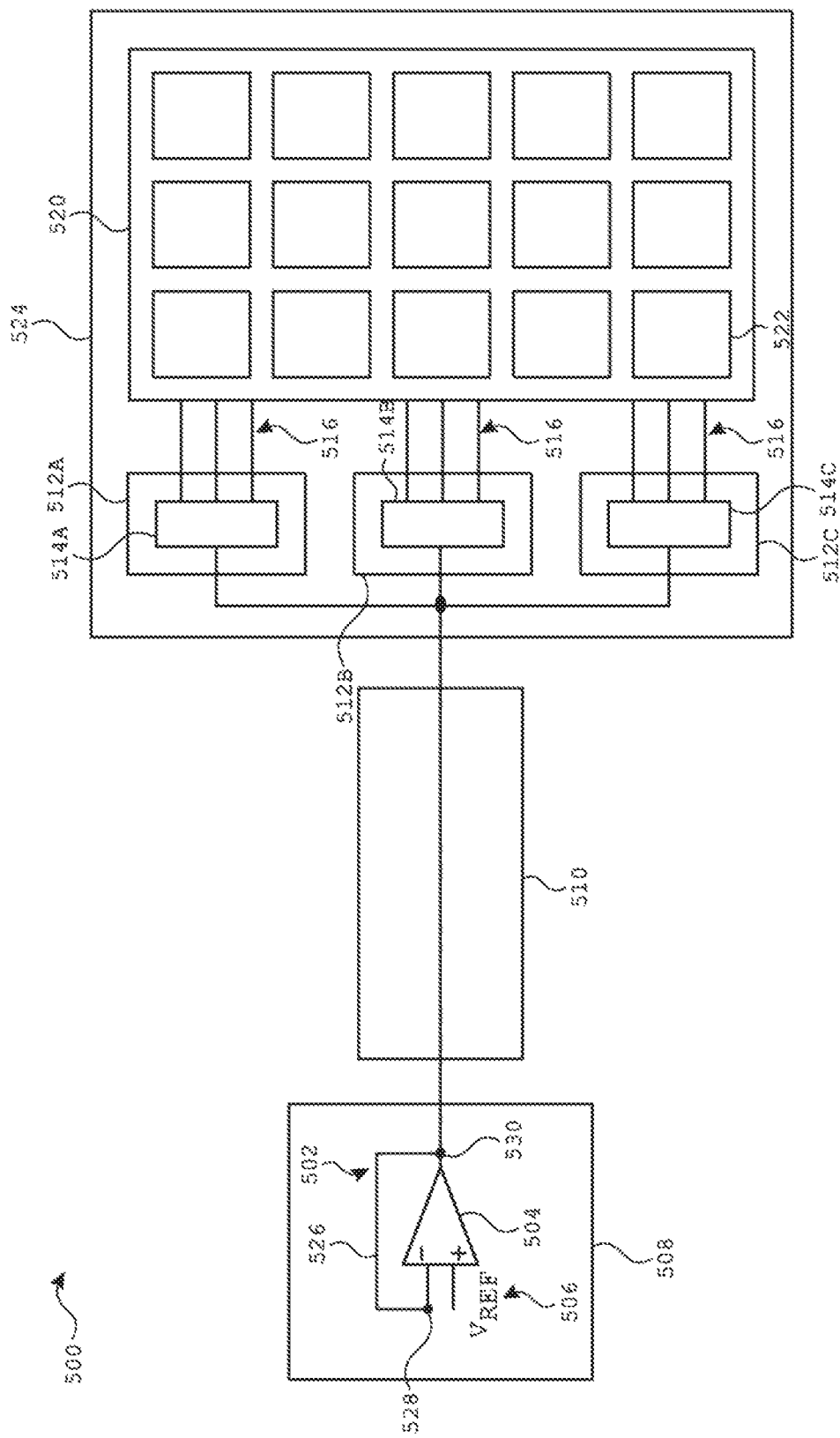
FIG. 5A illustrates an exemplary touch screen system configuration in which a driving circuit does not utilize remote feedback tapping according to examples of the disclosure.

During the display phase of touch screen 400, one or more common electrodes 402 may be driven to a reference voltage while display pixels 401 are updated or scanned. In some examples, common electrodes 402 can be driven by one or more driving circuits. In some examples, the driving circuits may utilize remote feedback tapping, while in other examples, the driving circuits may not utilize remote feedback tapping. FIG. 5A illustrates an exemplary touch screen system 500 configuration in which driving circuit 502 does not utilize remote feedback tapping according to examples of the disclosure. Touch screen system 500 can include various components. Specifically, touch screen system 500 can include one or more driving circuits 502, which can be formed in one or more driving integrated circuits (ICs) 508, flex circuit/connector 510, switching circuits 512A, 512B and 512C (referred to collectively as switching circuits 512) and touch screen 520. These components are provided by way of example only, and it is understood that in some examples, touch screen system 500 can have components that differ from those illustrated in FIG. 5A.

Driving circuit 502 can include amplifier 504 (e.g., an operational amplifier) having an inverting (−) and non-inverting input (+). Amplifier 504 can be configured in a unity gain configuration in which the output of the amplifier can be coupled to the inverting input of the amplifier, as illustrated. Specifically, a feedback line 526 can have a first end 528 coupled to the inverting input of amplifier 504, and a second end 530 coupled to the output of the amplifier, thus forming a feedback loop. A reference voltage (Vref) 506 can be coupled to the non-inverting input of amplifier 504. In this unity gain configuration, driving circuit 502 can drive a component to which it is coupled (e.g., a touch node electrode 522 on touch screen 520) at voltage Vref. Driving circuit 502 can be coupled to the component that it is driving via a driving line, which can include any coupling path that can exist between the output of amplifier 504 and the component. It is understood that the provided configuration of driving circuit 502 is exemplary only, and other driving circuit configurations may be employed; for example, additional components such as resistors and capacitors can be utilized in the driving circuit configuration, as appropriate.

In some examples, driving IC 508 can be disposed on a first substrate (e.g., a semiconductor substrate), and in some examples, the driving IC can be mounted on a suitable second substrate, such as a printed circuit board (PCB).

Driving IC 508 can be coupled to flex circuit 510. Flex circuit 510 can be a connector than can couple driving IC 508 and switching circuits 512, and can include one or more conductive traces for transmitting the output of the driving IC to the switching circuits and touch screen 520. A single conductive trace on flex circuit 510 is illustrated in FIG. 5A for ease of description, but it is understood that the flex circuit can include additional conductive traces within the scope of the disclosure. Flex circuit 510 can be formed on a substrate different than driving IC 508.

Flex circuit 510 can be coupled to switching circuits 512. Switching circuits 512 can include routing units 514 that can selectively couple the output of driving IC 508 (received at the input of the switching circuits) to one or more touch node electrodes 522 via touch node traces 516. For example, switching circuit 512a can be coupled to one or more touch node electrodes 522 via touch node traces 516. Routing unit 514a can selectively couple the input of switching circuit 512a (e.g., the output of driving IC 508) to one or more of touch node traces 516, and thus to corresponding touch node electrodes 522. In some examples, routing units 514 can comprise any suitable components, such as switches or multiplexers. In some examples, touch screen system 500 may not include switching circuits 512, in which case the output of driving IC 508 can be directly coupled to touch node electrodes 522—various aspects of the examples of the disclosure can similarly be utilized in such configurations. Touch screen 520 and switching circuits 512 can be disposed on any suitable touch screen substrate, such as a glass substrate. The components of touch screen system 500 (e.g., driving IC 508, flex circuit 510, switching circuits 512 and touch screen 520) can be electrically coupled in any appropriate manner, such as via conductive pads and traces.

Figure 5B:
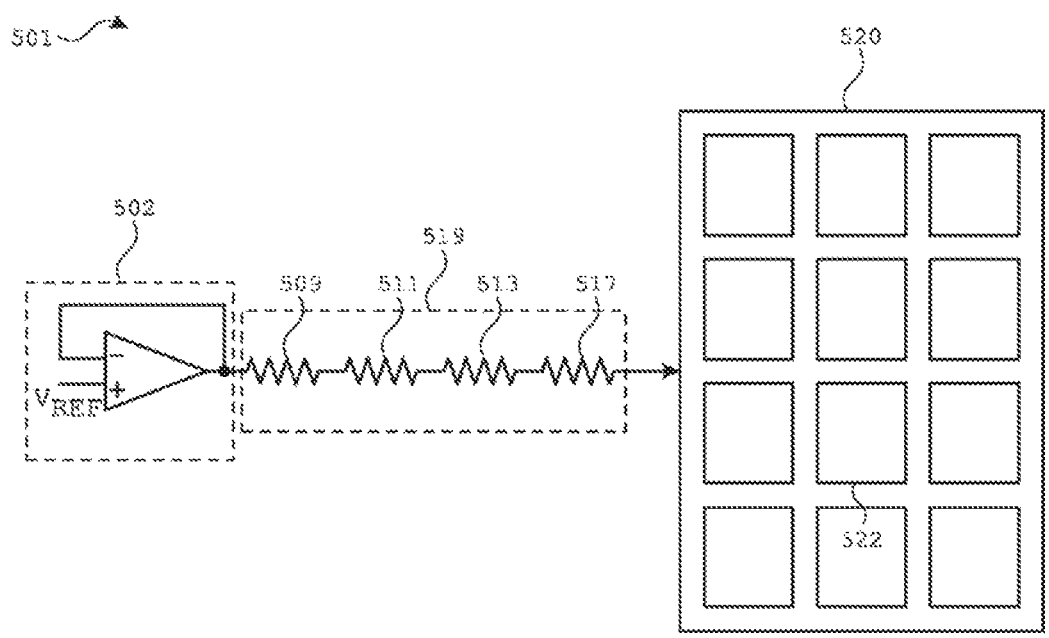
FIG. 5B illustrates a simplified circuit diagram of the touch screen system described with reference to FIG. 5A according to examples of the disclosure.

FIG. 5B illustrates a simplified circuit diagram 501 of touch screen system 500 described with reference to FIG. 5A according to examples of the disclosure. As previously discussed, driving circuit 502 can drive one or more touch node electrodes 522 on touch screen 520. The various components that separate driving circuit 502 from touch node electrodes 522 (as illustrated in FIG. 5A) can introduce resistances into the path between the driving circuit and the touch node electrodes. These resistances can include, but are not limited to, contact resistances (e.g., resistances associated with discontinuities in conductive traces, such as in going from driving IC 508 to flex circuit 510), conductive trace resistances, and resistances of other circuit components. For example, resistance 509 in FIG. 5B can represent conductive trace resistances and contact resistances that can exist between driving circuit 502 and flex circuit 510. Resistance 511 can represent conductive trace resistances and contact resistances associated with flex circuit 510. Resistance 513 can represent conductive trace resistances, contact resistances and component resistances (e.g., due to routing units 514) associated with switching circuits 512. Finally, resistance 517 can represent conductive trace resistances and contact resistances associated with touch node traces 516. Collectively, resistances 509, 511, 513 and 517 can be characterized as shared resistance 519. Although specific resistances 509, 511, 513 and 517 are illustrated in FIG. 5B, it is understood that shared resistance 519 can include any other resistance that can exist between the output of driving circuit 502 and the touch node electrodes 522 of touch screen 520. Conversely, in some examples, shared resistance 519 need not include all of resistances 509, 511, 513 and 517 illustrated in FIG. 5B, depending on particular configurations of touch screen system 500.

In some examples, the voltages on touch node electrodes 522 (in some examples, Vref) can be disturbed—that is to say that the voltages can deviate from Vref. These deviations can be caused for any number of reasons, including capacitive coupling that can exist between touch node electrodes 522 and other components of touch screen 520. For example, touch screen 520 can include various conductive lines distributed across it that transport various signals, such as data lines that can transport display data to display pixels in touch screen. If the voltage on a data line changes, and if that data line is positioned in touch screen 520 so as to be capacitively coupled to a touch node electrode 522, the voltage on the touch node electrode can, via the capacitive coupling, be disturbed from its initial value (e.g., Vref).

In order to reestablish the voltage on the disturbed touch node electrode to the target voltage (e.g., Vref), driving circuit 502 may need to charge or discharge the touch node electrode through shared resistance 519. In some examples, shared resistance 519 can be relatively large. Further, in some examples, driving circuit 502 can be coupled to a plurality of touch node electrodes 522 whose voltages have been disturbed, and which require charging or discharging through shared resistance 519. Thus, the effect of shared resistance 519 on a time constant analysis of the above charging/discharging can be substantial, and the shared resistance can substantially limit the bandwidth of the driving circuit 502 configuration and the settling time of voltages on touch node electrodes 522.

In some examples, the effect of shared resistance 519 can be reduced, as will be described now. The closed-loop output impedance of driving circuit 502 (i.e., the impedance presented by driving circuit 502 to touch node electrodes 522) can be expressed as:

$$Z_{out\text{-}closed} = Z_{out\text{-}open}/(1-G_{loop}) \quad (1)$$

where $Z_{out\text{-}closed}$ can be the closed-loop output impedance of the driving circuit, $Z_{out\text{-}open}$ can be the open-loop output impedance of the driving circuit, and $G_{loop}$ can be the loop gain of the driving circuit. In some examples—for example, in a unity gain configuration—$G_{loop}$ can be negative and relatively large, and thus the open-loop output impedance of driving circuit 502 can be reduced by a factor of:

$$1/(1-G_{loop}) \quad (2)$$

If any portion of shared resistance 519 can be included inside the feedback loop of driving circuit 502, that portion of the shared resistance can be incorporated into the open-loop output resistance of the driving circuit. Thus, that portion of the shared resistance 519 can present an effective resistance to touch node electrodes 522 that can be lower than that portion's true resistance by a factor of $1/(1-G_{loop})$. For example, in a configuration in which all of shared resistance 519 can be included within the feedback loop of driving circuit 502, the effective resistance presented by the shared resistance to touch node electrodes 522 can be expressed as:

$$R_{share}' = R_{share}/(1-G_{loop}) \quad (3)$$

where $R_{share}$ can correspond to the shared resistance and $R_{share}'$ can correspond to the effective shared resistance that the touch node electrodes can see. As such, shared resistance 519 seen by touch node electrodes 522, and the effect of the shared resistance on the time constant of the charging/discharging pathway between driving circuit 502 and touch node electrodes 522, can be significantly reduced. The bandwidth of the driving circuit 502 configuration can thus be increased.

Figure 5C:
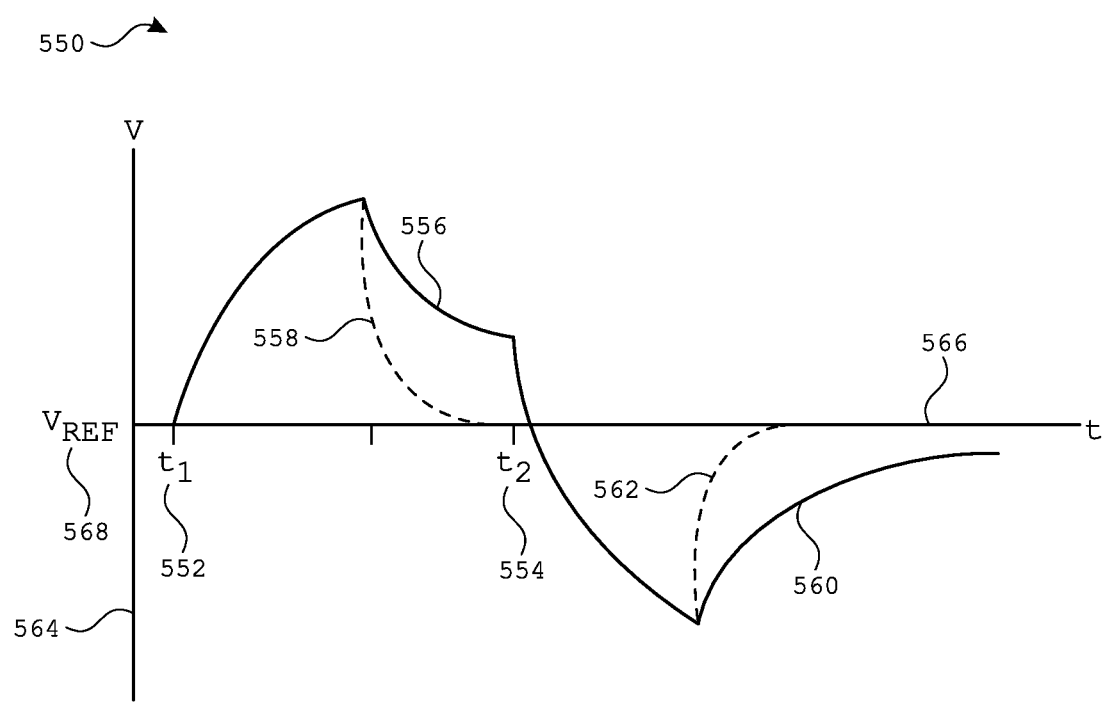
FIG. 5C illustrates an exemplary touch node electrode voltage plot reflecting relatively slow and relatively fast touch node electrode voltage settling behavior according to examples of the disclosure.

FIG. 5C illustrates an exemplary touch node electrode voltage plot 550 reflecting relatively slow and relatively fast touch node electrode voltage settling behavior according to examples of the disclosure. Vertical axis 564 can represent the voltage on a touch node electrode (e.g., touch node electrode 522 in FIGS. 5A and 5B). Horizontal axis 566 can represent time. Vref 568 can represent a target voltage for the touch node electrode. At time t1 552, the voltage on the touch node electrode can be disturbed (e.g., due to capacitive coupling), as illustrated. In a driving circuit configuration that has a relatively high shared resistance, the voltage on the touch node electrode can settle towards Vref 568 at a relatively slow rate, as illustrated by 556. Conversely, in a driving circuit configuration that has a relatively low shared resistance (or effective resistance), the voltage on the touch node electrode can settle towards Vref 568 at a relatively fast rate, as illustrated by 558.

At time t2 554, the voltage on the touch node electrode can be disturbed for a second time, as illustrated. In some examples, the second disturbance can occur before the touch node electrode voltage in the driving circuit configuration having the relatively high shared resistance has been able to recover to Vref 568. After the second disturbance, in the driving circuit configuration that has the relatively high shared resistance, the voltage on the touch node electrode can settle towards Vref 568 at a relatively slow rate, as illustrated by 560. Conversely, in the driving circuit configuration that has the relatively low shared resistance (or effective resistance), the voltage on the touch node electrode can settle towards Vref 568 at a relatively fast rate, as illustrated by 562. It can generally be desirable for the voltage on the touch node electrode to quickly return to its target voltage (e.g., Vref 568) for the reasons discussed previously.

Figure 6A:
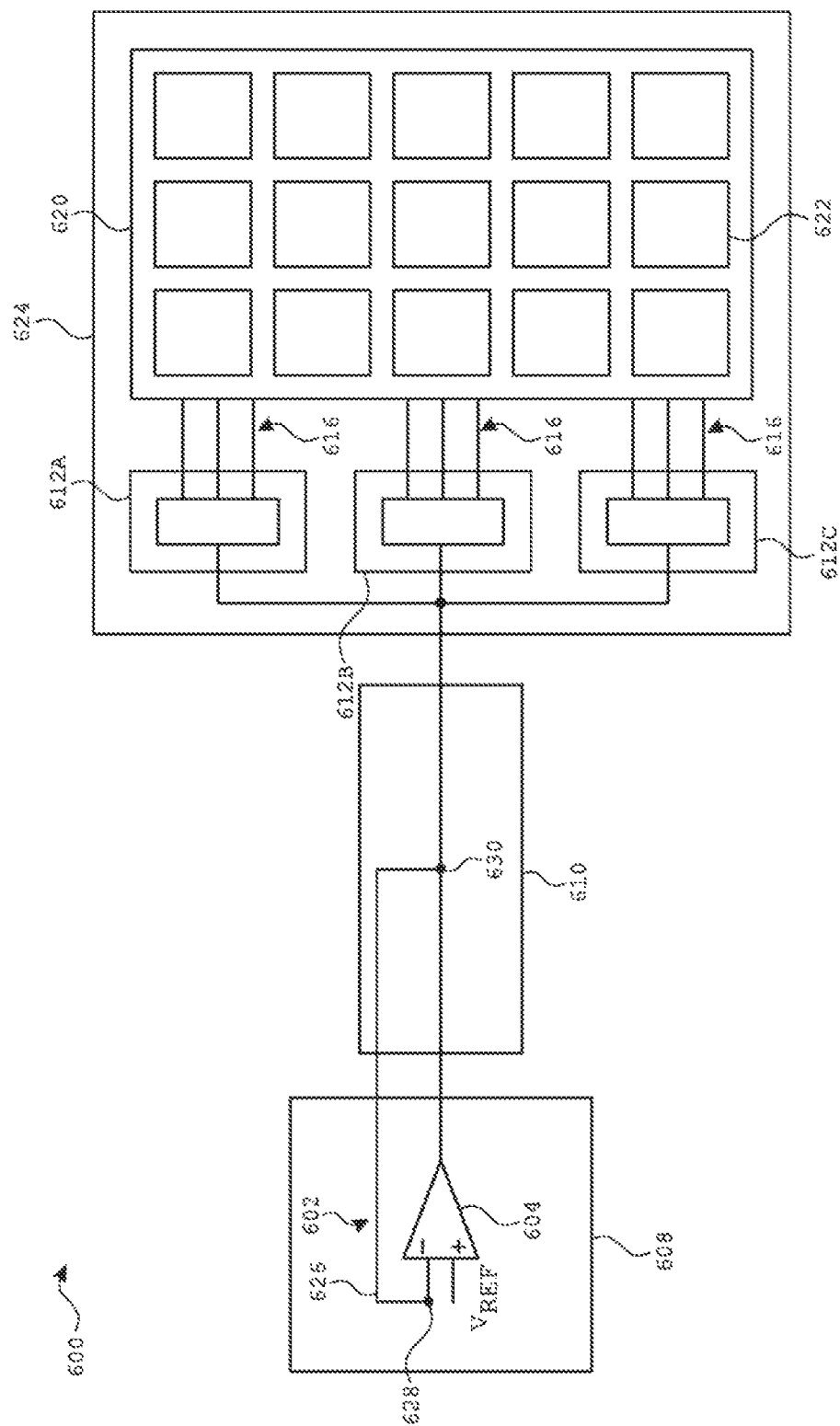
FIG. 6A illustrates an exemplary touch screen system configuration in which a driving circuit can utilize remote feedback tapping in a flex circuit according to examples of the disclosure.

FIG. 6A illustrates an exemplary touch screen system 600 configuration in which driving circuit 602 can utilize remote feedback tapping in flex circuit 610 according to examples of the disclosure. Touch screen system 600 can be substantially the same as touch screen system 500 in FIG. 5A, except that driving circuit 602 can utilize remote feedback tapping in flex circuit 610. Specifically, first end 628 of feedback line 626 can continue to be coupled to the inverting input (−) of amplifier 604 in driving IC 608; however, second end 630 of the feedback line can be coupled to the output of the amplifier, not in the driving IC, but rather in flex circuit 610, as illustrated. In other words, second end 630 of feedback line 626 can be "remotely tapped" from driving circuit 602 and driving IC 608—specifically, the second end of the feedback line can be remotely tapped to a driving line, which can be coupled to the output of amplifier 604, in flex circuit 610. Because of this remote tapping, a portion of feedback line 626 can be included in driving IC 608, and a portion of the feedback line can be included in flex circuit 610, as illustrated.

As a result of coupling second end 630 of feedback line 626 to the driving line within flex circuit 610, resistances associated with driving IC 608 and at least a portion of the flex circuit can be included within the feedback loop formed by the feedback line. For example, referring back to FIG. 5A, resistance 509 (representing driving IC 608-related resistances) and at least a portion of resistance 511 (representing flex circuit 610-related resistances) can be included within the feedback loop formed by feedback line 626 if second end 630 of the feedback line is coupled to the output of amplifier 604 in flex circuit 610. The effects of these resistances, which are included within the feedback loop, on the charging/discharging of touch node electrodes 622 can thus be reduced according to equations (1)-(3), above.

Figure 6B:
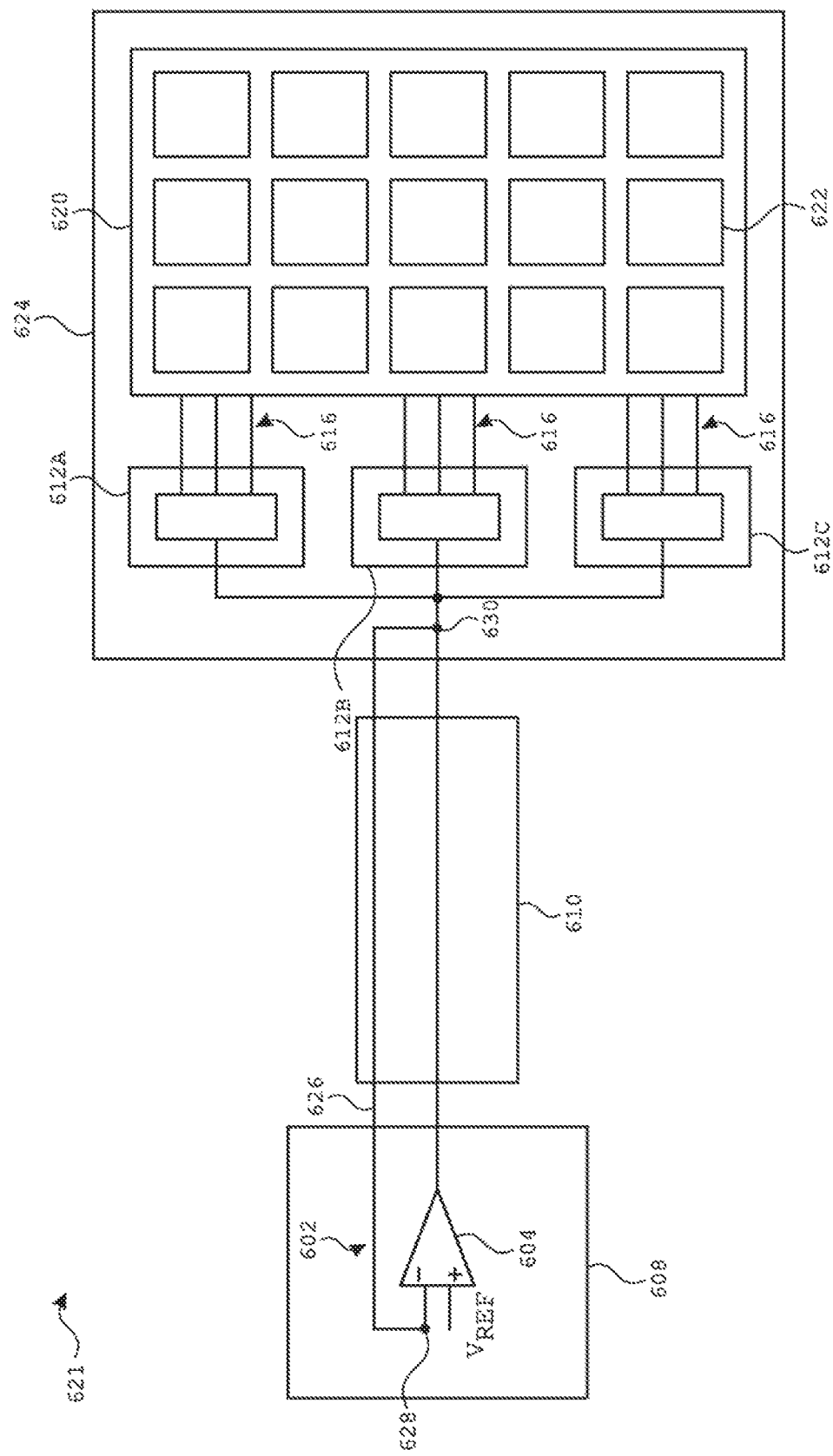
FIG. 6B illustrates an exemplary touch screen system configuration in which a driving circuit can utilize remote feedback tapping on a touch screen substrate according to examples of the disclosure.

FIG. 6B illustrates an exemplary touch screen system 621 configuration in which driving circuit 602 can utilize remote feedback tapping on substrate 624 according to examples of the disclosure. Touch screen system 621 can be substantially the same as touch screen system 500 in FIG. 5A, except that driving circuit 602 can utilize remote feedback tapping on substrate 624. Specifically, first end 628 of feedback line 626 can continue to be coupled to the inverting input (−) of amplifier 604 in driving IC 608; however, second end 630 of the feedback line can be coupled to the output of the amplifier, not in the driving IC, but rather on substrate 624, as illustrated (e.g., directly on the substrate, and not within switching circuits 612 or touch screen 620). In other words, second end 630 of feedback line 626 can be "remotely tapped" from driving circuit 602 and driving IC 608—specifically, the second end of the feedback line can be remotely tapped to a driving line, which can be coupled to the output of amplifier 604, on substrate 624. Because of this remote tapping, a portion of feedback line 626 can be included in driving IC 608, a portion of the feedback line can be included in flex circuit 610, and a portion of the feedback line can be included in substrate 624, as illustrated.

As a result of coupling second end 630 of feedback line 626 to the driving line within substrate 624, resistances associated with driving IC 608, flex circuit 610 and at least a portion of the substrate can be included within the feedback loop formed by the feedback line. For example, referring back to FIG. 5A, resistance 509 (representing driving IC 608-related resistances), resistance 511 (representing flex circuit 610-related resistances) and at least a portion of any contact and/or trace resistances that may exist in substrate 624 can be included within the feedback loop formed by feedback line 626 if second end 630 of the feedback line is coupled to the output of amplifier 604 on the substrate. The effects of these resistances, which are included within the feedback loop, on the charging/discharging of touch node electrodes 622 can thus be reduced according to equations (1)-(3), above.

Figure 6C:
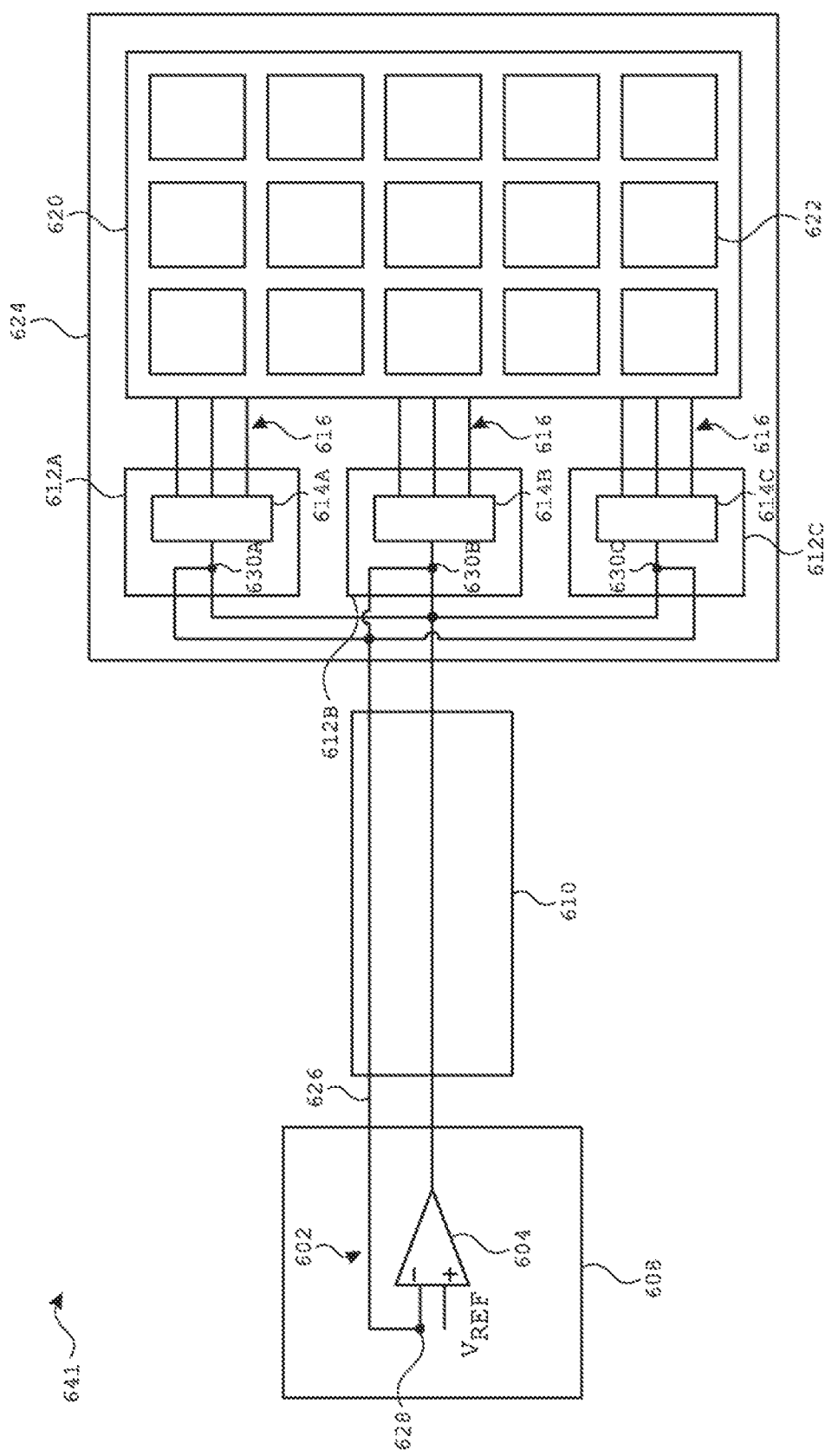
FIG. 6C illustrates an exemplary touch screen system configuration in which a driving circuit can utilize remote feedback tapping in switching circuits according to examples of the disclosure.

FIG. 6C illustrates an exemplary touch screen system 641 configuration in which driving circuit 602 can utilize remote feedback tapping in switching circuits 612 according to examples of the disclosure. Touch screen system 641 can be substantially the same as touch screen system 500 in FIG. 5A, except that driving circuit 602 can utilize remote feedback tapping in switching circuits 612. Specifically, first end 628 of feedback line 626 can continue to be coupled to the inverting input (−) of amplifier 604 in driving IC 608; however, second ends 630 of the feedback line can be coupled to the output of the amplifier, not in the driving IC, but rather in switching circuits 612, as illustrated. In other words, second ends 630 of feedback line 626 can be "remotely tapped" from driving circuit 602 and driving IC 608—specifically, the second ends of the feedback line can be remotely tapped to driving lines, which can be coupled to the output of amplifier 604, in switching circuits 612. Because of this remote tapping, a portion of feedback line 626 can be included in driving IC 608, a portion of the feedback line can be included in flex circuit 610, a portion of the feedback line can be included in substrate 624, and a portion of the feedback line can be included in switching circuits 612, as illustrated. It is noted that in FIG. 6C, feedback line 626 is illustrated as having three second ends 630a, 630b and 630c. This can be due to the fact that the output from driving circuit 602 can be divided into three driving lines—one for each of switching circuits 612a, 612b and 612c. Each switching circuit 612 can require its own feedback tapping point (e.g., second end 630) via which the output of amplifier 604 can be coupled back to the inverting input (−) of the amplifier. It is understood that in some examples, switching circuit 612 remote tapping can be implemented with a different number of switching circuits than as illustrated in FIG. 6C. For example, in a single switching circuit 612 configuration, feedback line 626 can have a single second end 630 that can be coupled to the output of amplifier 604 within the single switching circuit. Further, in some examples, despite the existence of three switching circuits 612, for example, feedback line 626 can be remote tapped in only one or two of the switching circuits, instead of all three.

As a result of coupling second ends 630 of feedback line 626 to the driving lines within switching circuits 612, resistances associated with driving IC 608, flex circuit 610, substrate 624 and at least a portion of the switching circuits can be included within the feedback loop formed by the feedback line. For example, referring back to FIG. 5A, resistance 509 (representing driving IC 608-related resistances), resistance 511 (representing flex circuit 610-related resistances), contact and/or trace resistances that may exist in substrate 624 and at least a portion of resistance 513 (representing switching circuit 612-related resistances) can be included within the feedback loop formed by feedback line 626 if second ends 630 of the feedback line are coupled to the output of amplifier 604 in the switching circuits. The effects of these resistances, which are included within the feedback loop, on the charging/discharging of touch node electrodes 622 can thus be reduced according to equations (1)-(3), above.

Figure 6D:
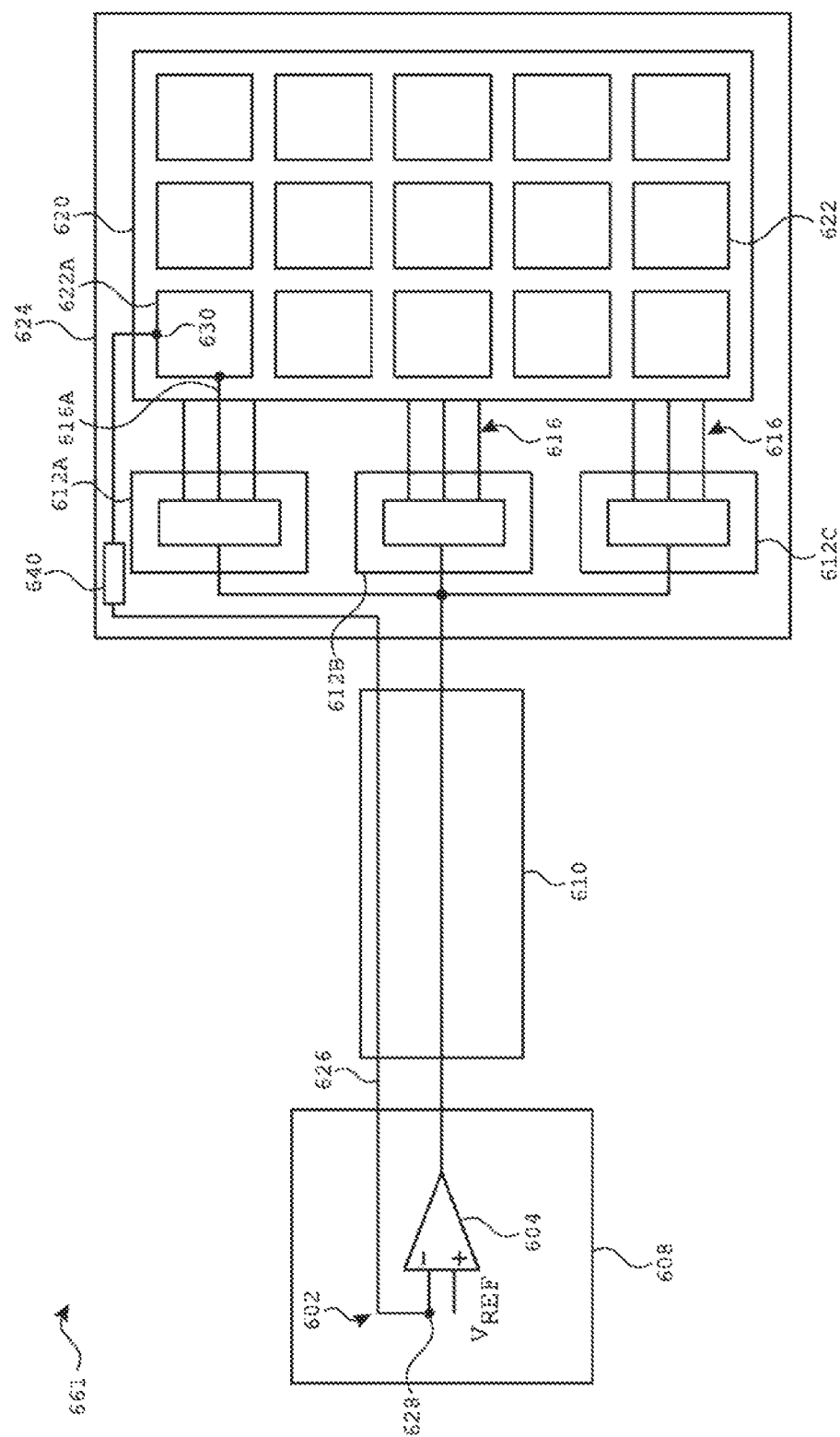
FIG. 6D illustrates an exemplary touch screen system configuration in which a driving circuit can utilize remote feedback tapping in a touch screen according to examples of the disclosure.
Figure 6E:
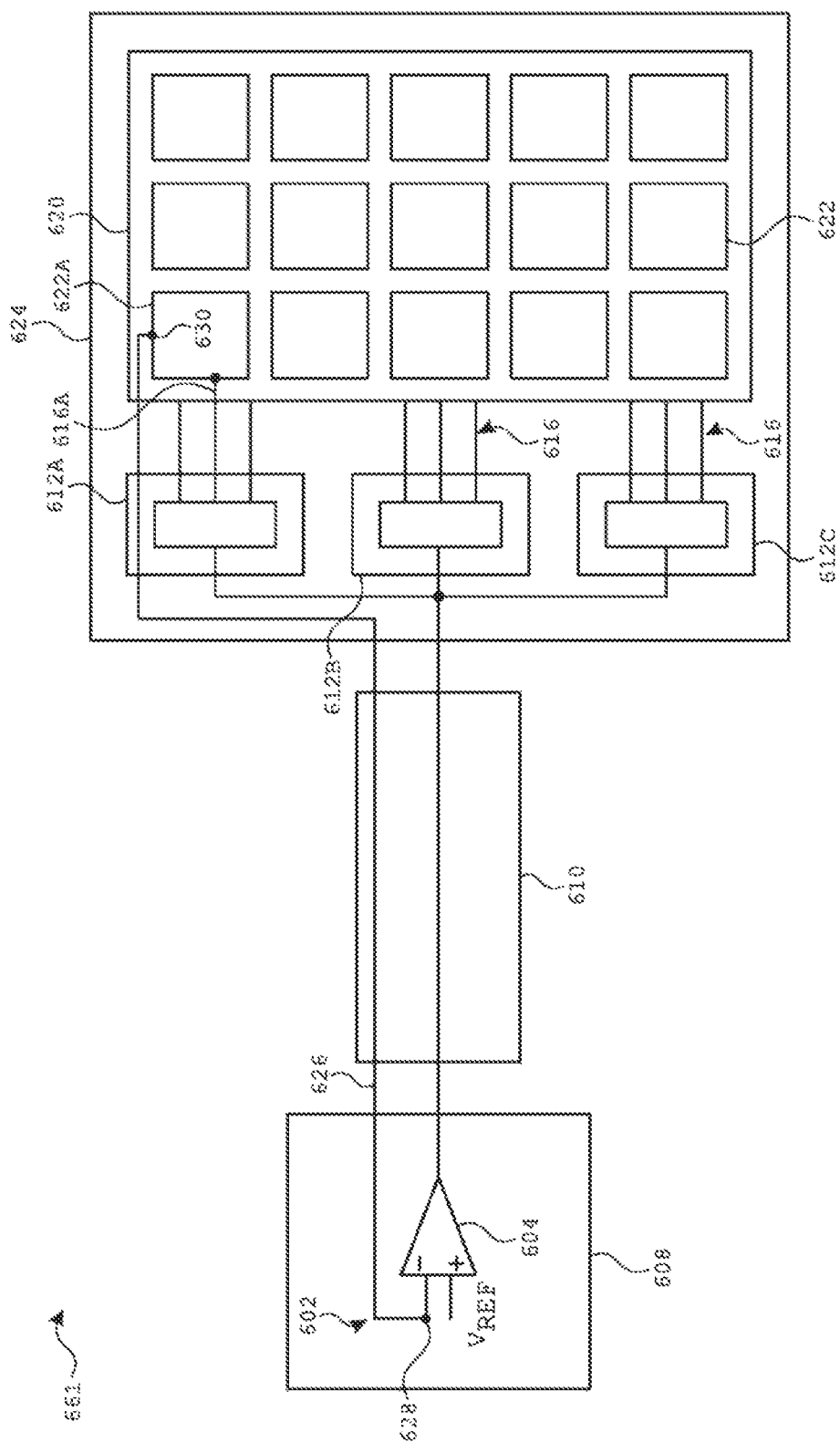
FIG. 6E illustrates another exemplary touch screen system configuration in which a driving circuit can utilize remote feedback tapping in a touch screen according to examples of the disclosure.

FIG. 6D illustrates an exemplary touch screen system 661 configuration in which driving circuit 602 can utilize remote feedback tapping in touch screen 620 according to examples of the disclosure. Touch screen system 661 can be substantially the same as touch screen system 500 in FIG. 5A, except that driving circuit 602 can utilize remote feedback tapping in touch screen 620. Specifically, first end 628 of feedback line 626 can continue to be coupled to the inverting input (−) of amplifier 604 in driving IC 608; however, second end 630 of the feedback line can be coupled to the output of the amplifier, not in the driving IC, but rather in touch screen 620—in some examples, at touch node electrode 622a, as illustrated. In other words, second end 630 of feedback line 626 can be "remotely tapped" from driving circuit 602 and driving IC 608—specifically, the second end of the feedback line can be remotely tapped at touch node electrode 622a in touch screen 620. Because of this remote tapping, a portion of feedback line 626 can be included in driving IC 608, a portion of the feedback line can be included in flex circuit 610, a portion of the feedback line can be included in substrate 624, and a portion of the feedback line can be included in touch screen 620, as illustrated. In some examples, feedback line 626 can be coupled to a plurality of touch node electrodes 622 (e.g., some or all touch node electrodes); however, coupling to a single touch node electrode (touch node electrode 622a) is illustrated for ease of description. In some examples, second end 630 of feedback line 626 can be remotely tapped to touch node trace 616a instead of to touch node electrode 622a. In some examples, feedback line 626 can be routed through switching circuit 612a to touch node electrode 622a or touch node trace 616a, as illustrated in FIG. 6E. In some examples, feedback line 626 can pass through switch 640, which can electrically couple or decouple, as appropriate, second end 630 of the feedback line from amplifier 604. For example, switch 640 can electrically decouple (e.g., electrically isolate) second end 630 of feedback line 626 from amplifier 604 when the amplifier is not driving touch node electrode 622a, and can electrically couple the second end of the feedback line to the amplifier when the amplifier is driving touch node electrode 622a. In some examples, switch 640 can be located on substrate 624 (as illustrated), in switching circuits 612, in flex circuit 610, or in driving IC 608.

As a result of coupling second end 630 of feedback line 626 at touch node electrode 622a, resistances associated with driving IC 608, flex circuit 610, substrate 624, switching circuits 612 (in particular, switching circuit 612a) and touch node traces 616 (in particular, touch node trace 616a) can be included within the feedback loop formed by the feedback line. For example, referring back to FIG. 5A, resistance 509 (representing driving IC 608-related resistances), resistance 511 (representing flex circuit 610-related resistances), contact and/or trace resistances that may exist in substrate 624, resistance 513 (representing switching circuit 612-related resistances) and resistance 517 (representing touch node trace 616-related resistances) can be included within the feedback loop formed by feedback line 626 if second end 630 of the feedback line is coupled to the output of amplifier 604 at touch node electrode 622a. The effects of these resistances, which are included within the feedback loop, on the charging/discharging of touch node electrodes 622 (in particular, touch node electrode 622a) can thus be reduced according to equations (1)-(3), above.

It is understood that the remote feedback tapping configurations provided in FIGS. 6A-6E are exemplary only, and that remote feedback tapping locations other than the ones illustrated can be utilized in accordance with the examples of the disclosure.

Thus, the examples of the disclosure provide various remote feedback tapping configurations for reducing the effect of resistances, which may exist between driving circuits and touch node electrodes, on the charging/discharging of those touch node electrodes, therefore reducing touch node electrode voltage settling time and increasing touch sensor panel performance.

Therefore, according to the above, some examples of the disclosure are directed to a system comprising: drive circuitry included in a first component of the system, the drive circuitry configured to drive a first touch electrode on a touch sensor panel; a driving line configured to couple an output of the drive circuitry to the first touch electrode; and a feedback line configured to couple the output of the drive circuitry to an input of the drive circuitry, wherein a first end of the feedback line is coupled to the input of the drive circuitry at the first component, and a second end of the feedback line is configured to be coupled to the output of the drive circuitry at a second component, different from the first component, of the system. Additionally or alternatively to one or more of the examples disclosed above, in some examples, a first portion of the feedback line is included in the first component, and a second portion of the feedback line is included in the second component. Additionally or alternatively to one or more of the examples disclosed above, in some examples, the second end of the feedback line is coupled to the output of the drive circuitry at least partially through the driving line. Additionally or alternatively to one or more of the examples disclosed above, in some examples, the second end of the feedback line is coupled directly to the first touch electrode. Additionally or alternatively to one or more of the examples disclosed above, in some examples, the first and second components are disposed on different substrates. Additionally or alternatively to one or more of the examples disclosed above, in some examples, the first component comprises a driving integrated circuit (IC) including the drive circuitry, and the second component comprises the touch sensor panel including the first touch electrode. Additionally or alternatively to one or more of the examples disclosed above, in some examples, the system further comprises: switching circuitry coupled between the drive circuitry and the first touch electrode at least partially through the driving line, the switching circuitry configured to selectively couple the drive circuitry to the first touch electrode on the touch sensor panel; and a first conductive trace coupled between the switching circuitry and the first touch electrode, wherein: the first component comprises a driving IC, the second component comprises the touch sensor panel including the first conductive trace, and the second end of the feedback line is coupled to the output of the drive circuitry at the first conductive trace. Additionally or alternatively to one or more of the examples disclosed above, in some examples, the system further comprises: switching circuitry coupled between the drive circuitry and the first touch electrode at least partially through the driving line, the switching circuitry configured to selectively couple the drive circuitry to the first touch electrode, a second touch electrode, or both, on the touch sensor panel, wherein: the first component comprises a driving IC, the second component comprises the switching circuitry, and the second end of the feedback line is coupled to the output of the drive circuitry inside the switching circuitry. Additionally or alternatively to one or more of the examples disclosed above, in some examples, the system further comprises: first switching circuitry coupled between the drive circuitry and the first touch electrode at least partially through the driving line, the first switching circuitry configured to selectively couple the drive circuitry to the first touch electrode on the touch sensor panel; and second switching circuitry coupled between the drive circuitry and a second touch electrode at least partially through the driving line, the second switching circuitry configured to selectively couple the drive circuitry to the second touch electrode on the touch sensor panel, wherein: the first component comprises a driving IC, the second component comprises the first switching circuitry and the second switching circuitry, the second end of the feedback line is coupled to the output of the drive circuitry inside the first switching circuitry, and a third end of the feedback line is coupled to the output of the drive circuitry inside the second switching circuitry. Additionally or alternatively to one or more of the examples disclosed above, in some examples, the first component comprises a driving IC, and the second component comprises a flex circuit coupled between the driving IC and the touch sensor panel. Additionally or alternatively to one or more of the examples disclosed above, in some examples, the drive circuitry is configured to operate as a unity gain buffer. Additionally or alternatively to one or more of the examples disclosed above, in some examples, the input of the drive circuitry is coupled to a reference voltage at which to drive the first touch electrode. Additionally or alternatively to one or more of the examples disclosed above, in some examples, the touch sensor panel comprises a pixelated self-capacitance touch sensor panel, and the first touch electrode comprises a pixelated self-capacitance touch node electrode. Additionally or alternatively to one or more of the examples disclosed above, in some examples, the touch sensor panel comprises a part of a touch screen, the touch screen configured to operate in a touch sensing phase and a display phase, and the drive circuitry is configured to drive the first touch electrode at a reference voltage during the display phase.

Some examples of the disclosure are directed to a method comprising: driving a first touch electrode on a touch sensor panel with drive circuitry, the drive circuitry included in a first component of a system; coupling an output of the drive circuitry to the first touch electrode with a driving line; and coupling the output of the drive circuitry to an input of the drive circuitry with a feedback line, wherein a first end of the feedback line is coupled to the input of the drive circuitry at the first component, and a second end of the feedback line is configured to be coupled to the output of the drive circuitry at a second component, different from the first component, of the system. Additionally or alternatively to one or more of the examples disclosed above, in some examples, the second end of the feedback line is coupled directly to the first touch electrode. Additionally or alternatively to one or more of the examples disclosed above, in some examples, the first and second components are disposed on different substrates. Additionally or alternatively to one or more of the examples disclosed above, in some examples, the first component comprises a driving integrated circuit (IC) including the drive circuitry, and the second component comprises the touch sensor panel including the first touch electrode. Additionally or alternatively to one or more of the examples disclosed above, in some examples, the method further comprises: coupling switching circuitry between the drive circuitry and the first touch electrode at least partially through the driving line, the switching circuitry configured to selectively couple the drive circuitry to the first touch electrode, a second touch electrode, or both, on the touch sensor panel, wherein: the first component comprises a driving IC, the second component comprises the switching circuitry, and the second end of the feedback line is coupled to the output of the drive circuitry inside the switching circuitry. Additionally or alternatively to one or more of the examples disclosed above, in some examples, the method further comprises: coupling first switching circuitry between the drive circuitry and the first touch electrode at least partially through the driving line, the first switching circuitry configured to selectively couple the drive circuitry to the first touch electrode on the touch sensor panel; and coupling second switching circuitry between the drive circuitry and a second touch electrode at least partially through the driving line, the second switching circuitry configured to selectively couple the drive circuitry to the second touch electrode on the touch sensor panel, wherein: the first component comprises a driving IC, the second component comprises the first switching circuitry and the second switching circuitry, the second end of the feedback line is coupled to the output of the drive circuitry inside the first switching circuitry, and a third end of the feedback line is coupled to the output of the drive circuitry inside the second switching circuitry.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system comprising:
   drive circuitry included in a first component, disposed on a first substrate, of the system, the drive circuitry configured to drive a plurality of touch electrodes on a touch sensor panel;
   one or more switching circuits coupled between an output of the drive circuitry and the plurality of touch electrodes, wherein:
   the one or more switching circuits include one or more input terminals coupled to a driving line and one or more output terminals coupled to the plurality of touch electrodes,
   the one or more switching circuits are configured to selectively couple the drive circuitry to one or more of the plurality of touch electrodes,
   the driving line is coupled to the output of the drive circuitry and the one or more input terminals of the one or more switching circuits, and
   the driving line is configured to drive the one or more of the plurality of touch electrodes with the output of the drive circuitry; and
   a feedback line configured to couple, at a second end, to the output of the drive circuitry and, at a first end, to an input of the drive circuitry, wherein the first end of the feedback line is located on the first substrate, and the second end of the feedback line is coupled to the driving line between the output of the drive circuitry and the one or more input terminals of the one or more switching circuits and is located on a second substrate, different from the first substrate, for performing remote feedback tapping on the second substrate.

2. The system of claim 1, wherein a first portion of the feedback line is included in the first component, and a second portion of the feedback line is included in a second component, different than the first component.

3. The system of claim 2, wherein the first component comprises a driving integrated circuit (IC) including the drive circuitry, and the second component comprises the touch sensor panel including the plurality of touch electrodes.

4. The system of claim 2, further comprising:
   a first conductive trace coupled between a respective switching circuit of the one or more switching circuits and a first touch electrode of the one or more touch electrodes,
   wherein:
   the first component comprises a driving IC,
   the second component comprises the touch sensor panel including the first conductive trace, and
   the second end of the feedback line is coupled to the output of the drive circuitry at the first conductive trace.

5. The system of claim 2, wherein:
   a respective switching circuit of the one or more switching circuits is configured to selectively couple the drive circuitry to a first touch electrode of the one or more touch electrodes, a second touch electrode of the one or more touch electrodes, or both, on the touch sensor panel,
   the first component comprises a driving IC,
   the second component comprises the respective switching circuit, and
   the second end of the feedback line is coupled to the output of the drive circuitry inside the respective switching circuit.

6. The system of claim 2, wherein:
   a first switching circuit of the one or more switching circuits is configured to selectively couple the drive circuitry to a first touch electrode of the one or more touch electrodes on the touch sensor panel, and
   a second switching circuit of the one or more switching circuits is configured to selectively couple the drive circuitry to a second touch electrode of the one or more touch electrodes on the touch sensor panel,
   the first component comprises a driving IC,
   the second component comprises the first switching circuit and the second switching circuit,
   the second end of the feedback line is coupled to the output of the drive circuitry inside the first switching circuit, and
   a third end of the feedback line is coupled to the output of the drive circuitry inside the second switching circuit.

7. The system of claim 2, wherein the first component comprises a driving IC, and the second component comprises a flex circuit coupled between the driving IC and the touch sensor panel.

8. The system of claim 1, wherein the second end of the feedback line is coupled to the output of the drive circuitry at least partially through the driving line.

9. The system of claim 1, wherein the drive circuitry is configured to operate as a unity gain buffer.

10. The system of claim 9, wherein the input of the drive circuitry is coupled to a reference voltage at which to drive the one or more touch electrodes.

11. The system of claim 1, wherein the touch sensor panel comprises a pixelated self-capacitance touch sensor panel, and the one or more touch electrodes comprise pixelated self-capacitance touch node electrodes.

12. The system of claim 1, wherein:
    the touch sensor panel comprises a part of a touch screen, the touch screen configured to operate in a touch sensing phase and a display phase, and
    the drive circuitry is configured to drive the one or more touch electrodes at a reference voltage during the display phase.

13. The system of claim 1, wherein the one or more input terminals of the one or more switching circuits are coupled to the output of the drive circuitry via the driving line.

14. The system of claim 1, wherein a first end of the driving line is coupled to the output of the drive circuitry and a second end of the driving line is coupled to the one or more input terminals of the one or more switching circuits.

15. A method comprising:
    driving, via one or more switching circuits and a driving line, one or more touch electrodes on a touch sensor panel with drive circuitry, the drive circuitry included in a first component, disposed on a first substrate, of a system, the one or more switching circuits coupled between an output of the drive circuitry and the one or more touch electrodes, wherein:
    the one or more switching circuits include one or more input terminals coupled to the driving line and one or more output terminals coupled to the one or more touch electrodes,
    the one or more switching circuits are configured to selectively couple the drive circuitry to one or more of the one or more touch electrodes, and
    the driving line is coupled to the output of the drive circuitry and the one or more input terminals of the one or more switching circuits; and coupling the output of the drive circuitry to an input of the drive circuitry with a feedback line, wherein a first end of the feedback line is coupled to the input of the drive circuitry and is located on the first substrate, and a second end of the feedback line is coupled to the driving line between the output of the drive circuitry and the one or more input terminals of the one or more switching circuits and is located on a coupling path between the drive circuitry and the one or more input terminals of the one or more switching circuits and on a second substrate, different from the first substrate, for performing remote feedback tapping on the second substrate.

16. The method of claim 15, further comprising a second component of the system, the second component comprising the one or more touch electrodes.

17. The method of claim 16, wherein the first component comprises a driving integrated circuit (IC) including the drive circuitry, and the second component comprises the touch sensor panel including the one or more touch electrodes.

18. The method of claim 16, wherein;
- a respective switching circuit of the one or more switching circuits is configured to selectively couple the drive circuitry to a first touch electrode of the one or more touch electrodes, a second touch electrode of the one or more touch electrodes, or both, on the touch sensor panel,
- the first component comprises a driving IC,
- the second component comprises the respective switching circuit, and
- the second end of the feedback line is coupled to the output of the drive circuitry inside the respective switching circuit.

19. The method of claim 16, wherein:
- a first switching circuit of the one or more switching circuits is configured to selectively couple the drive circuitry to a first touch electrode of the one or more touch electrodes on the touch sensor panel, and
- a second switching circuit of the one or more switching circuits is configured to selectively couple the drive circuitry to a second touch electrode of the one or more touch electrodes on the touch sensor panel,
- the first component comprises a driving IC,
- the second component comprises the first switching circuit and the second switching circuit,
- the second end of the feedback line is coupled to the output of the drive circuitry inside the first switching circuit, and
- a third end of the feedback line is coupled to the output of the drive circuitry inside the second switching circuit.

20. The method of claim 15, wherein the one or more input terminals of the one or more switching circuits are coupled to the output of the drive circuitry via the driving line.

21. The method of claim 15, wherein a first end of the driving line is coupled to the output of the drive circuitry and a second end of the driving line is coupled to the one or more input terminals of the one or more switching circuits.

* * * * *